United States Patent
Tervonen et al.

(10) Patent No.: US 9,585,084 B2
(45) Date of Patent: Feb. 28, 2017

(54) DYNAMIC CONTROL OF NETWORK SELECTION

(75) Inventors: Janne Petteri Tervonen, Espoo (FI); Jari Pekka Mustajarvi, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 29 days.

(21) Appl. No.: 14/407,708

(22) PCT Filed: Jun. 15, 2012

(86) PCT No.: PCT/EP2012/061481
§ 371 (c)(1),
(2), (4) Date: Dec. 12, 2014

(87) PCT Pub. No.: WO2013/185841
PCT Pub. Date: Dec. 19, 2013

(65) Prior Publication Data
US 2015/0172998 A1    Jun. 18, 2015

(51) Int. Cl.
*H04W 48/12* (2009.01)
*H04W 48/16* (2009.01)
(Continued)

(52) U.S. Cl.
CPC ........... *H04W 48/12* (2013.01); *H04W 48/16* (2013.01); *H04W 48/18* (2013.01); *H04W 84/12* (2013.01); *H04W 88/06* (2013.01)

(58) Field of Classification Search
None
See application file for complete search history.

(56) References Cited

U.S. PATENT DOCUMENTS

2008/0242297 A1* 10/2008 Lee .................. H04W 48/14
                                                              455/434
2010/0323698 A1   12/2010 Rune et al.
(Continued)

FOREIGN PATENT DOCUMENTS

JP      2010016843 A    1/2010
WO  WO 2008/068608 A2  6/2008
(Continued)

OTHER PUBLICATIONS

3GPP TS 23.402 V11.2.0 (Mar. 2012); 3rd Generation Partnership Project; Technical Specification Group Services and System Aspects; Architecture enhancements for non-3GPP accesses (Release 11); 251 pages.
(Continued)

*Primary Examiner* — Min Jung
(74) *Attorney, Agent, or Firm* — Squire Patton Boggs (US) LLP

(57) ABSTRACT

There are provided measures for dynamic control of network selection. Such measures exemplarily comprise receiving a network list, said network list comprising at least one network discovery element, each of said at least one network discovery elements represents a particular network and comprises at least connection information for connecting to said network and a category assigned to said network, receiving a control signaling comprising at least one desired category, and selecting said network based on said at least one desired category and the category assigned to said network.

15 Claims, 6 Drawing Sheets

(51) Int. Cl.
*H04W 48/18* (2009.01)
*H04W 84/12* (2009.01)
*H04W 88/06* (2009.01)

(56) References Cited

U.S. PATENT DOCUMENTS

| | | | |
|---|---|---|---|
| 2011/0317571 A1 | 12/2011 | Kokkinen et al. | |
| 2014/0211648 A1* | 7/2014 | Rahmati | H04W 48/12 370/252 |
| 2015/0117425 A1* | 4/2015 | Gupta | H04L 5/0032 370/338 |
| 2015/0172876 A1* | 6/2015 | Mustajarvi | H04W 4/06 455/404.1 |
| 2016/0044591 A1* | 2/2016 | Pao | H04W 72/10 370/329 |
| 2016/0066251 A1* | 3/2016 | Sirotkin | H04W 48/14 370/328 |

FOREIGN PATENT DOCUMENTS

| | | |
|---|---|---|
| WO | 2010147527 A1 | 12/2010 |
| WO | 2012041532 A1 | 4/2012 |
| WO | 2012064067 A2 | 5/2012 |

OTHER PUBLICATIONS

3GPP TS 24.302 V11.2.0 (Mar. 2012); 3rd Generation Partnership Project; Technical Specification Group Core Network and Terminals; Access to the 3GPP Evolved Packet Core (EPC) via non-3GPP access networks; Stage 3 (Release 11); 59 pages.
3GPP TS 24.312 V11.2.0 (Mar. 2012); 3rd Generation Partnership Project; Technical Specification Group Core Network and Terminals; Access Network Discovery and Selection Function (ANDSF) Management Object (MO) (Release 11); 159 pages.
Japanese Office Action, Application No. JP2015516489, Dated Nov. 24, 2015.
International Search Report and Written Opinion dated Dec. 4, 2012 corresponding to International Patent Application No. PCT/EP2012/061481.
Panasonic et al., "Interaction of ANDSF with enhanced policy framework," 3GPP Draft, TD S2-104705, 3GPP TSG SA WG2 Meeting #81, Oct. 11-15, 2010, Prague, Czech Republic, 2 pages.
Japanese Office Action dated Jul. 27, 2016, issued in Corresponding JP Application No. 2015-516489, pp. 1-3.
Motorola Mobility "UE behavior when not capable of simultaneous traffic over multiple interfaces", 3GPP Change Request, S2-121441, V.10.7.0, SA WG2 Meeting #90. Apr. 16-20, 2012. pp. 1-6.

* cited by examiner

DYNAMIC CONTROL OF NETWORK SELECTION

FIELD

The present invention relates to dynamic control of network selection. More specifically, the present invention exemplarily relates to measures (including methods, apparatuses and computer program products) for realizing dynamic control of network selection.

BACKGROUND

The present specification generally relates to dynamic control, from network side, of network selection by terminals connecting to the network.

In network deployments like Long Term Evolution (LTE) or LTE-Advanced networks, in order to enable efficient offloading of traffic from the main radio link to e.g. Wi-Fi networks (Wi-Fi offloading), operators prefer having some degree of control over the terminal's (e.g. user equipment (UE)) Wi-Fi usage. All current major smart phone platforms (iOS, Android and Windows Phone) work such that, when a detected Wi-Fi network is known by the device (that is, a user or a provisioning server has configured certain Wi-Fi network details so that the UE can connect to that Wi-Fi network), the UE automatically connects to that Wi-Fi.

In such scenario, which Wi-Fi network is used by the UE can be only influenced by the operator (the network) by affecting which Wi-Fi networks are known by the UE.

Besides proprietary solutions to handle the above mentioned requirements of the operator/network, which are deployed only in very small scale, the Third Generation Partnership Project (3GPP) Access Network Discovery and Selection Function (ANDSF) provides standardized functionality which may handle the scenario described above. Namely, ANDSF server and UE client functionality is defined. ANDSF relies on an Open Mobile Alliance (OMA) device management (DM) framework for ANDSF information exchange between the server (i.e. the ANDSF Server) and client (i.e. the UE).

According to 3GPP specifications, ANDSF provides inter-system mobility policy (ISMP), Discovery Information as well as inter-system routing policy (ISRP), which are described below.

ISMP can be used to prioritize Wi-Fi networks over each other and also over 3GPP networks. ISMP is used when the UE does not support simultaneous 3GPP and Wi-Fi radio usage. An example of prioritized ISMP would be Wi-Fi with service set identifier (SSID)=Operator_A having highest priority followed by any Wi-Fi available, with 3GPP radio accesses having the lowest priority. Following this policy, the UE would connect to the network access of available network accesses having the highest priority according to the policy. ISMP was introduced in 3GPP Release 8.

Discovery Information can be used to tell the UEs where certain Wi-Fi networks are available. Each Wi-Fi network may be associated with a location area identifier that can be based e.g. on 3GPP identifiers (location area code (LAC), tracking area code (TAC) and/or cell identities (ID), etc.) to allow the device to optimize Wi-Fi scanning. Also, it is possible to configure Wi-Fi access details, like used extensible authentication protocol (EAP) methods and their respective credentials or pre-shared key (PSK) for certain Wi-Fi network. In practice, Discovery Information can be used to make Wi-Fi networks "known" to the UEs. That is, a UE is able connect to the identified Wi-Fi networks after receiving respective Discovery Information.

ISRP can be used to prioritize radio accesses for specific applications. Applications are identified with Internet protocol (IP) 5-tuples, e.g. with IP addresses, IP protocol and IP protocol port numbers. With Rel-11, it is also possible to identify traffic with fully qualified domain network (FQDN) or with operating system (OS)-specific Application ID. With ISRP, it is assumed that the device (i.e. UE) can use both 3GPP and Wi-Fi radio accesses simultaneously. An example of prioritized ISRP would be for YouTube traffic (identified application) Wi-Fi with SSID=Operator_A having highest priority followed by any Wi-Fi available, with 3GPP radio accesses having the lowest priority. Following this policy, the UE would use for the identified application the network access of available network accesses having the highest priority according to the policy.

Just to be complete, ANDSF management object (MO) can be used to convey location information of the UE to the ANDSF server during ANDSF session.

It is to be noted that ANDSF server and client implementations may support any combination of the above described ANDSF functionality.

It is further to be noted that ANDSF is not very suitable for real-time operations due to its dependency on the OMA DM framework.

In particular, setting up an ANDSF session can take several seconds. Further the transfer between the server and client of the actual ANDSF information may cause a further delay. Thus, the basic use model for ANDSF is such that the ANDSF information (ISMP, Discovery Information, ISRP) is provisioned to the UE, and then UE uses the same set of information for a certain period of time. Such period may for example be one week. Consequently, the actual ANDSF information can be considered as being static, which does not support a dynamic control.

Hence, the problem arises if UE only supports ANDSF Discovery Information and no ANDSF policies (neither ISMP nor ISRP). In such case a 3GPP operator can influence UE's Wi-Fi network selection by affecting which Wi-Fi networks are known by the UE, i.e. by the Discovery Information. Due to the static character of ANDSF information, the operator has almost no tools to affect in suitable time (i.e. nearly real time) which Wi-Fi networks can be selected by UEs. Such tools (kind of dynamic ANDSF) are needed to react in reasonable time to e.g. changing load conditions.

Hence, there is a need to provide the dynamic control of network selection.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving a network list, said network list comprising at least one network discovery element, each of said at least one network discovery elements represents a particular network and comprises at least connection information for connecting to said network and a category assigned to said network, receiving a control signaling comprising at least one desired category, and selecting said network based on said at least one desired category and the category assigned to said network.

According to an exemplary aspect of the present invention, there is provided a method comprising transmitting a network list, said network list comprising at least one network discovery element, each of said at least one network discovery elements represents a particular network and comprises at least connection information for connecting to said network and a category assigned to said network, determining at least one desired category, and transmitting a control signaling comprising said at least one desired category.

According to an exemplary aspect of the present invention, there is provided an apparatus comprising a connection controller configured to receive a network list, said network list comprising at least one network discovery element, each of said at least one network discovery elements represents a particular network and comprises at least connection information for connecting to said network and a category assigned to said network, and to receive a control signaling comprising at least one desired category, and a control module configured to select said network based on said at least one desired category and the category assigned to said network.

According to an exemplary aspect of the present invention, there is provided an apparatus comprising a connection controller configured to transmit a network list, said network list comprising at least one network discovery element, each of said at least one network discovery elements represents a particular network and comprises at least connection information for connecting to said network and a category assigned to said network, and a control module configured to determine at least one desired category, wherein said connection controller is further configured to transmit a control signaling comprising said at least one desired category.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient dynamic control, from 3GPP network side (operator), of network selection by terminals connecting to the network. That is, which networks are "known" by UEs can be influenced dynamically by the operator, such that it can be reacted in reasonable time to e.g. changing load conditions. Further, none of the above aspects interferes with the logic of Wi-Fi network selection implemented in the current smart phones, and is fully backwards compatible. In particular, devices not supporting it just stores and uses the Discovery Information as currently defined in ANDSF specifications.

By way of exemplary embodiments of the present invention, there is provided dynamic control of network selection. More specifically, by way of exemplary embodiments of the present invention, there are provided measures and mechanisms for realizing dynamic control of network selection.

Thus, improvement is achieved by methods, apparatuses and computer program products enabling/realizing dynamic control of network selection.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, LTE and LTE-Advanced network deployment is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which terminals can connect besides to 3GPP radio accesses also to Wi-Fi radio accesses (simultaneously or exclusively).

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) dynamic control of network selection.

To enable such dynamic control of network selection, the following principle is to be extended: if the operator wants the UE to use certain Wi-Fi network, the certain Wi-Fi network is to be made known to the UE. Additionally, if some Wi-Fi network should not be used anymore by the UE, this Wi-Fi network should be stopped from being known by the UE. That is, this Wi-Fi network is to be removed from a UE's internal "known Wi-Fi networks" database.

In order to achieve such extension, according to exemplary embodiments of the present invention ANDSF usage is made dynamic also for devices supporting only Discovery Information. At that, according to exemplary embodiments of the present invention usage of DiscoveryInformation in ANDSF is extended.

Figure 1:
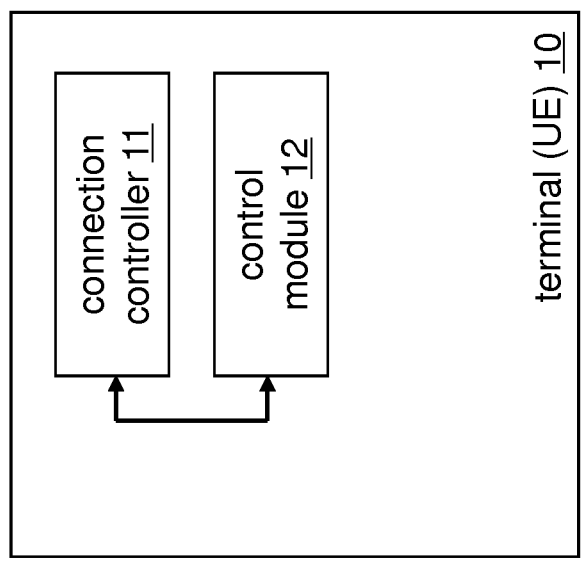
FIG. 1 is a block diagram illustrating an apparatus according to exemplary embodiments of the present invention.

FIG. 1 is a block diagram illustrating an apparatus according to exemplary embodiments of the present invention.

As shown in FIG. 1, according to exemplary embodiments of the present invention, the apparatus is a terminal 10 comprising a connection controller 11 and a control module 12. The connection controller 11 receives a network list, said network list comprising at least one network discovery element, each of said at least one network discovery elements represents a particular network and comprises at least connection information for connecting to said network and a category assigned to said network. In other words, the UE is provided with all DiscoveryInformation nodes that are configured for the subscriber by the 3GPP operator (home public land mobile network (HPLMN) or visited public land mobile network (VPLMN)).

Further, the connection controller 11 receives a control signaling comprising at least one desired category. In other words, it is indicated to the UE which parts of the DiscoveryInformation are to be considered, i.e. to be applied. Such indication may be performed using out-of-band mechanism (from ANDSF point of view), i.e. on a channel different from the channel providing the actual ANDSF information, and is done by means of "categories". A category itself does not have to have a meaning for the subscriber. The service provider has to be able to identify a category or categories to the UE and UE shall then select that or those categories. Such out-of-band mechanism is preferably a broadcast service like Cell Broadcast Service or System Information broadcast (or possibly a multicast service). After UE has downloaded all DiscoveryInformation nodes from the server, i.e. after UE has received the network list, the UE listens a defined out-of-band mechanism, e.g. Cell Broadcast Service, in order to receive the control signaling comprising at least one desired category.

The control module 12 selects said network based on said at least one desired category and the category assigned to said network.

According to further exemplary embodiments of the present invention, the control module 12 adds, upon receipt of said control signaling, a network discovery element not existing in a desired network list from said network list to said desired network list, if the category comprised by said network element corresponds to said at least one desired category, and further removes, upon receipt of said control signaling, a network discovery element from said network list, if the category comprised by said network discovery element does not correspond to said at least one desired category.

In other words, when the UE notices there is a new "category" or set of categories identified with the out-of-band mechanism, the UE performs the following steps:

1. UE reads the contents of the earlier-provisioned ANDSF MO DiscoveryInformation nodes tagged with the newly noticed "category" or a category of the newly noticed set of categories from its memory and adds corresponding information about the identified Wi-Fi networks into its internal database of known Wi-Fi networks (here it is assumed that ANDSF MO stored into UE's memory and UE's internal database of known Wi-Fi networks are distinct internal databases), and 2. UE removes the Wi-Fi networks tagged with other "category" than just received via out-of-band mechanism from its internal database of known Wi-Fi networks.

According to still further exemplary embodiments of the present invention, the connection controller 11 may connect to at least one network represented by a network discovery element in said desired network list.

It is to be noted that according to exemplary embodiments of the present invention the connection information comprises at least one of a network type of said network, information for identification of said network, and optionally configuration information for enabling access to said network.

It is to be noted that according to exemplary embodiments of the present invention the control signaling comprises a name of one desired category, or the control signaling comprises a part of a name and/or a wildcard indicative of one or more desired categories, or the control signaling comprises a bit string, wherein each bit position of the bit string is assigned to a certain desired category.

The apparatus as shown in FIG. 1 may be operable as or at a terminal, user equipment, mobile station or modem, and may be operable in at least one of a 3GPP cellular system (e.g. 2G, 3G, LTE or a LTE-A cellular system).

Further, the network discovery element may be an access network discovery and selection function ANDSF DiscoveryInformation node, the network may be a Wi-Fi network, the control signaling is preferably a broadcast service like cell broadcast service or system information broadcast, and the configuration information for enabling access may be an extensible authentication protocol EAP method and/or a pre-shared key PSK.

Figure 2:
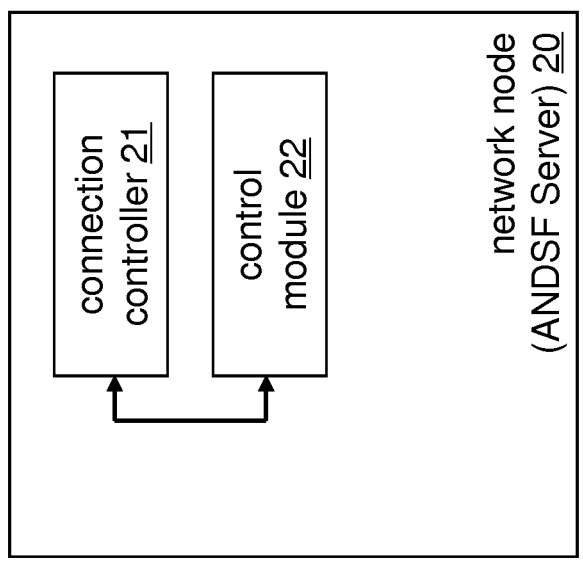
FIG. 2 is a block diagram illustrating an apparatus according to exemplary embodiments of the present invention.

FIG. 2 is a block diagram illustrating an apparatus according to exemplary embodiments of the present invention.

As shown in FIG. 2, according to exemplary embodiments of the present invention, the apparatus is a network node 20 (e.g. an ANDSF Server) comprising a connection controller 21 and a control module 22. The connection controller 21 transmits a network list, said network list comprising at least one network discovery element, each of said at least one network discovery elements represents a particular network and comprises at least connection information for connecting to said network and a category assigned to said network. In other words, when a UE contacts the ANDSF server, the server provides the UE with all DiscoveryInformation nodes that are configured for the UE. It is to be noted that within the ANDSF session, the server checks what information is applicable for the UE based on various criteria, e.g. subscription and UE_Location. Applied criteria are, however, server and/or UE implementation-dependant. Hence, DiscoveryInformation can also be subscriber-specific. Alternatively, if the operator wishes to limit the amount of nodes based on a geographical area and UE's location, only those nodes that are applicable to the defined geographical area are provided to the UE, e.g. for a single city or a state or a certain region.

The control module 22 determines at least one desired category. This applies to the operators possibility to control which of the possible networks the UE is allowed to connect to. At that, the determination corresponds to the decision of the (operator of the) 3GPP network based on e.g. changing load conditions.

Further, the connection controller 21 transmits a control signaling comprising said at least one desired category. Such transmission may be performed by means of out-of-band mechanism (from ANDSF point of view), i.e. on a channel different from the channel providing the actual ANDSF information, and is done by means of "categories". The out-of-band mechanism may preferably be a broadcast service like Cell Broadcast Service or System Information broadcast, both broadcasted by a 3GPP cell.

It is to be noted that according to exemplary embodiments of the present invention each of the at least one desired categories is indicative a particular network to be used.

It is further to be noted that according to exemplary embodiments of the present invention the connection information comprises at least one of a network type of the network, information for identification of said network, and (optionally) configuration information for enabling access to said network.

It is further to be noted that according to exemplary embodiments of the present invention the control signaling comprises an indication of one desired category. In other words, when the ANDSF server sends DiscoveryInformation, the server allocates its own name to each node marked as 'X' in ANDSF MO. According to exemplary embodiments of the present invention, specific naming convention is used to group the DiscoveryInformation instances (instances of ANDSF/Discovery-Information/<X> nodes). Namely, the name of the node may consist of "category" and a unique name within the category. "Categories" need to be agreed to some pre-defined values, e.g. LowLoad, MediumLoad, HighLoad, etc. For example, the server could allocate names ANDSF/Discovery-Information/LowLoad_1, ANDSF/DiscoveryInformation/LowLoad_2 and ANDSF/DiscoveryInformation/MediumLoad_1 for three different instances of ANDSF/DiscoveryInformation/<X> nodes. Such approach does not necessarily require ANDSF MO modification in standardization. Any naming convention can be used as long as both UE and server apply to it.

Figure 5:
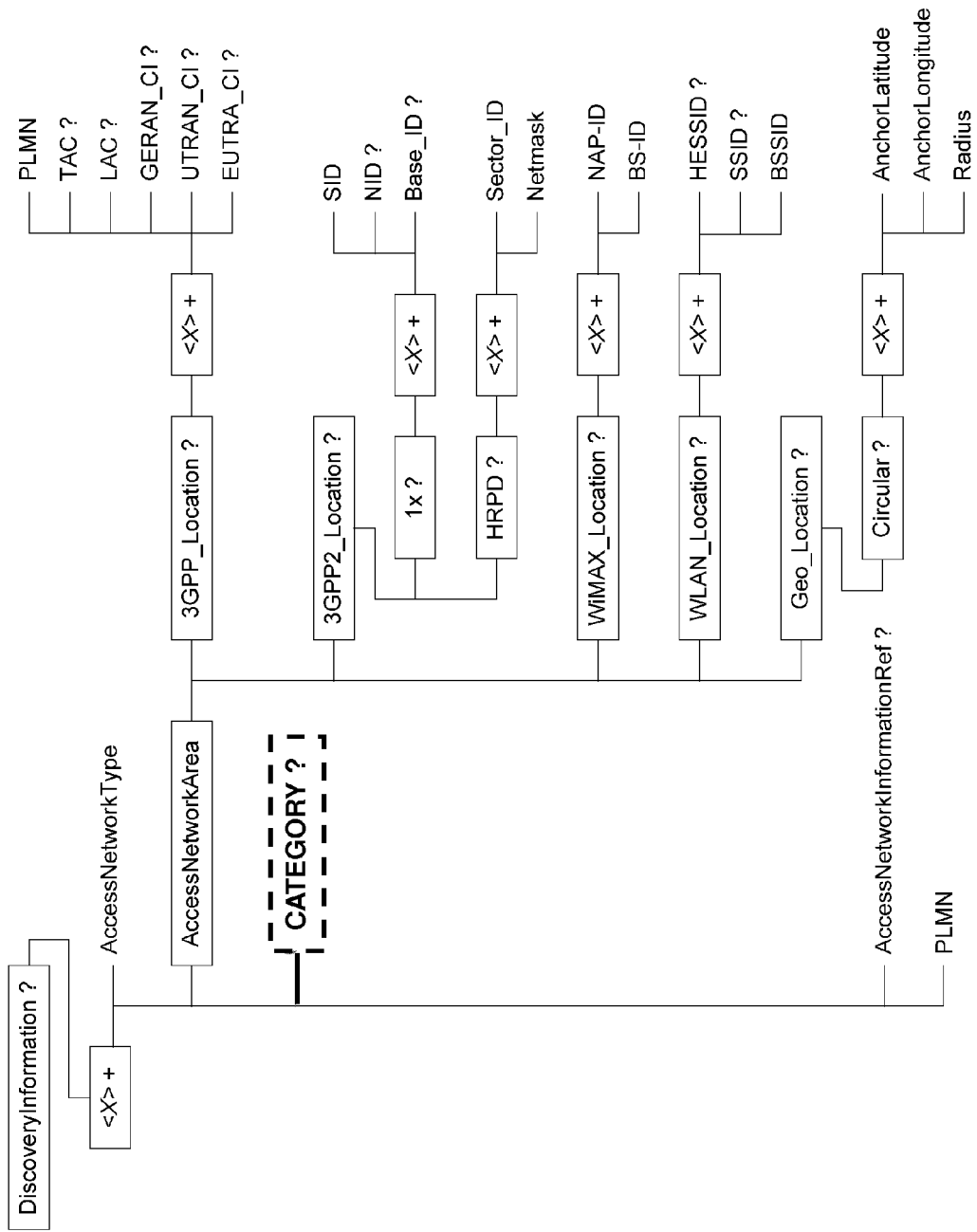
FIG. 5 shows a schematic diagram illustrating an extension of Discovery Information according to exemplary embodiments of the present invention.

Instead of relying on naming of ANDSF/DiscoveryInformation/<X> nodes in a specific way, according to exemplary embodiments of the present invention the "category" is identified in ANDSF MO structure. At that, a new leaf is to be added into ANDSF MO, as illustrated in FIG. 5. As shown in FIG. 5, according to exemplary embodiments of the present invention, the new leaf "Category" framed by a dashed rectangle is added to the node structure. It is to be noted that this approach would require specification change in 3GPP. In particular, ANDSF MO specification is to be adapted.

Alternatively, according to exemplary embodiments of the present invention the control signaling comprises a part of a name and/or a wildcard indicative of one or more desired categories. In other words, instead of identifying a specific "category" with its name, it is also possible to use regular expressions to identify more than one category at a time. In particular if there are exemplary different categories with names starting with letter '1', out-of-band mechanism could contain '1*' (using the asterisk '*' as a wildcard) as the information for category identification, identifying all categories with first letter being '1'.

Alternatively, according to exemplary embodiments of the present invention the control signaling comprises a bit string, wherein each bit position of said bit string is assigned to a certain desired category. That is, each category may be identified by a certain bit position in a bit string. Consequently, the control signaling may comprise an integer (i.e. another bit string) serving as a bit mask for designating desired categories. With such designating bit mask either one or a plurality of desired categories can be designated. It is to be noted that the bit string may be transmitted as a binary string or as a corresponding decimal, octal or hexadecimal (etc.) value.

In other words, each category is associated with a bitmask value. For example first category is "1_PreferredWLANs" and a second category is "2_SecondaryWLANs". Accordingly, the bitmask value 00000001 (1 in decimal) is associated with the first category, and 00000010 (2 in decimal) is associated with the second category. As an exemplary case the operator intends to change the set of networks to which to UE shall connect, e.g. when there is congestion in cellular, and the operator wants to take all Wi-Fi networks into use, i.e. both the first and second category. The broadcast mechanism would in this case just send the value 00000011 (3 in decimal) to indicate both Wi-Fi categories.

As a modification thereof, instead of putting each Wi-Fi network into only one category, a Wi-Fi network may also be put into more than one category, such that one Wi-Fi network can be chosen by more than one categories. That is, DiscoveryInformation indicates to what categories the single Wi-Fi network belongs to. For example, the first Wi-Fi network belongs to two categories and this could be identified with name "1_2_PreferredWLANs", and the second Wi-Fi network only belongs to the second category which could be identified with "2_SecondaryWLANs". In this case, out-of-band broadcast mechanism indicates the active category, e.g. "2". UE then applies all DiscoveryInformation nodes that belong to that category "2".

The apparatus as shown in FIG. 2 may be operable as or at a network node of a cellular system or access network discovery and selection function ANDSF serve. The apparatus as shown in FIG. 2 may be operable in at least one of a 3GPP cellular system.

Figure 3:
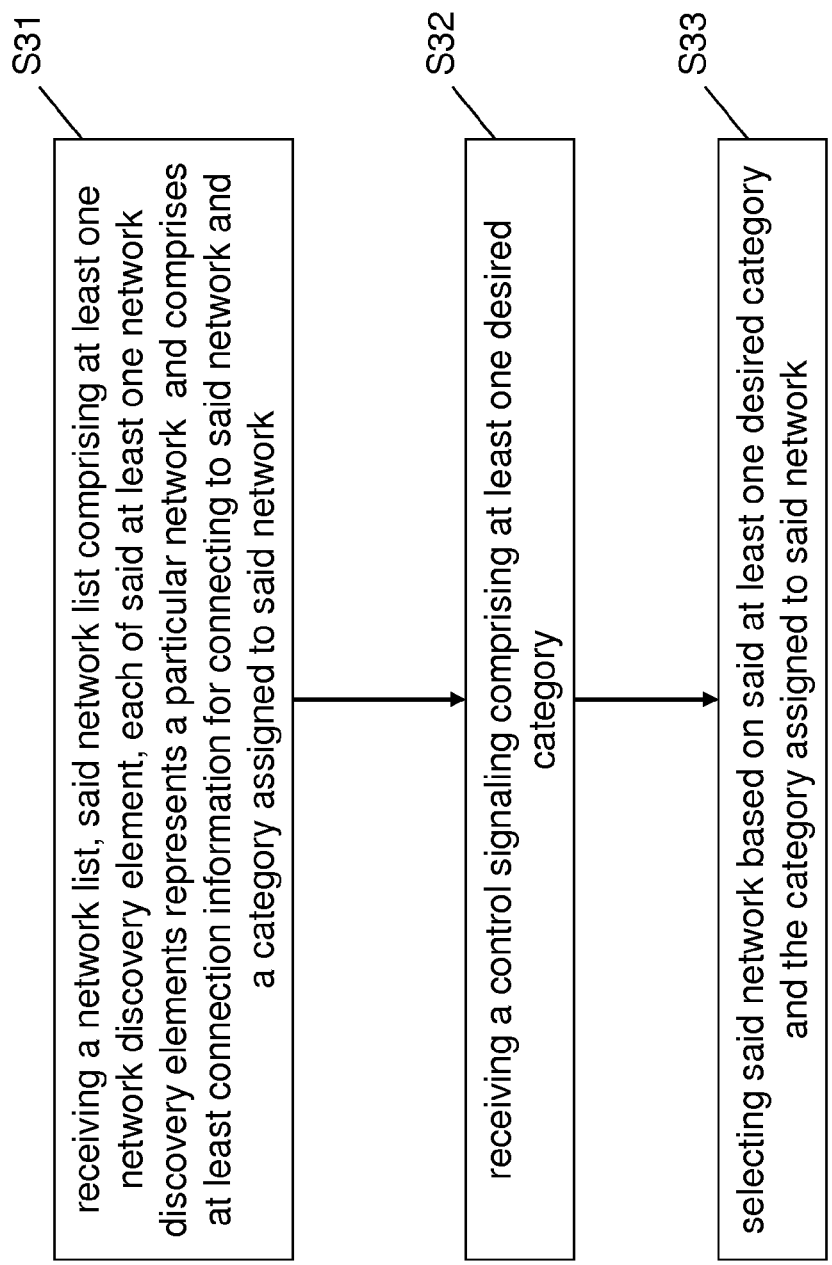
FIG. 3 is a schematic diagram of a procedure according to exemplary embodiments of the present invention.

FIG. 3 is a schematic diagram of a procedure according to exemplary embodiments of the present invention.

As shown in FIG. 3, a procedure according to exemplary embodiments of the present invention comprises an operation of receiving a network list, said network list comprising at least one network discovery element, each of said at least one network discovery elements represents a particular network and comprises at least connection information for connecting to said network and a category assigned to said network, an operation of receiving a control signaling comprising at least one desired category, and an operation of selecting said network based on said at least one desired category and the category assigned to said network.

According to a variation of the procedure shown in FIG. 3, exemplary details of the selecting operation are given, which are inherently independent from each other as such.

Such exemplary selecting operation according to exemplary embodiments of the present invention may comprise an operation of adding, upon receipt of said control signaling, a network discovery element not existing in a desired network list from said network list to said desired network list, if the category comprised by said network element corresponds to said at least one desired category, and an operation of removing, upon receipt of said control signaling, a network discovery element from said desired network list, if the category comprised by said network discovery element does not correspond to said at least one desired category.

According to a variation of the procedure shown in FIG. 3, exemplary details of the selecting operation are given, which are inherently independent from each other as such.

Such exemplary selecting operation according to exemplary embodiments of the present invention may comprise an operation of connecting to at least one network represented by a network discovery element in said desired network list.

According to exemplary embodiments of the present invention, the connection information comprises at least one of a network type of the network, information for identification of said network, and configuration information for enabling access to said network.

According to further exemplary embodiments of the present invention, the control signaling comprises a name of one desired category.

According to still further exemplary embodiments of the present invention, the control signaling comprises a part of a name and/or a wildcard indicative of one or more desired categories.

According to still further exemplary embodiments of the present invention the control signaling comprises a bit string, wherein each bit position of said bit string is assigned to a certain desired category.

Figure 4:
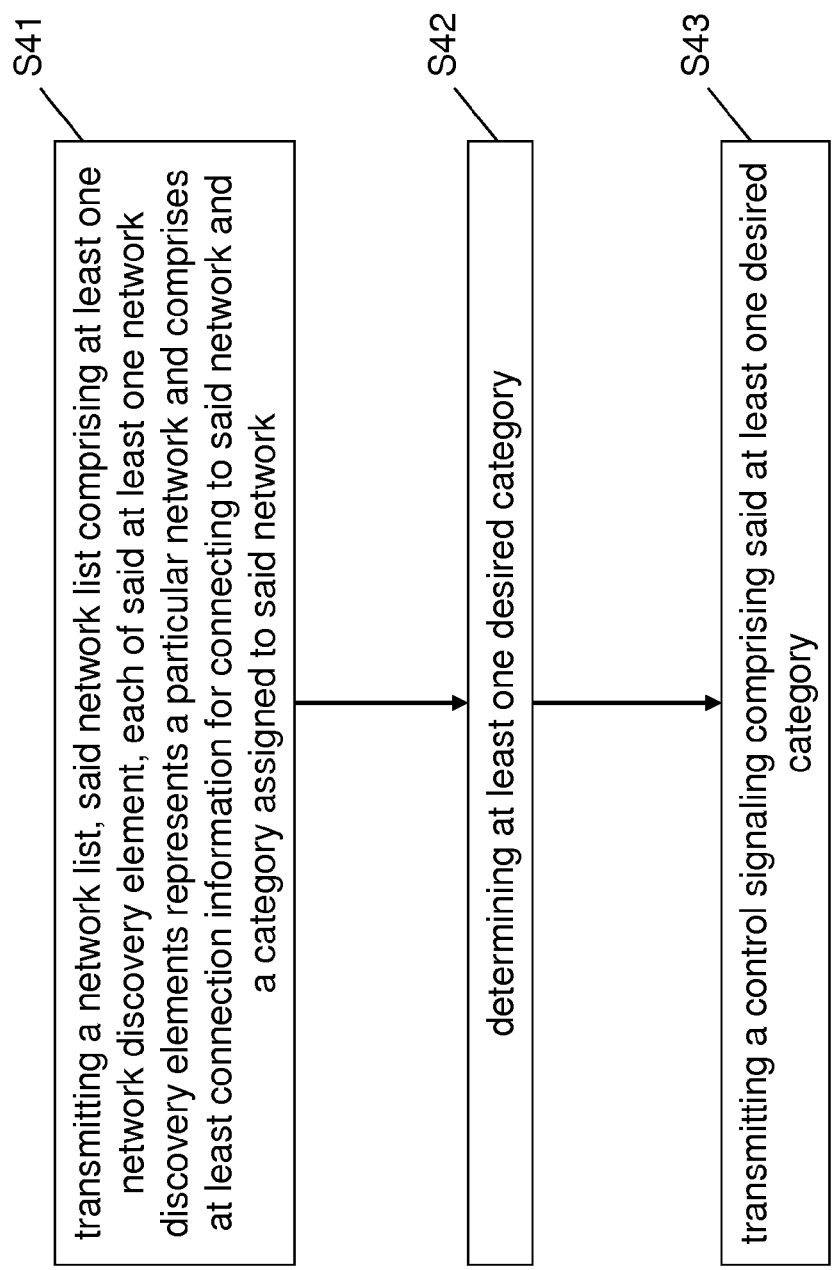
FIG. 4 is a schematic diagram of a procedure according to exemplary embodiments of the present invention.

FIG. 4 is a schematic diagram of a procedure according to exemplary embodiments of the present invention.

As shown in FIG. 4, a procedure according to exemplary embodiments of the present invention comprises an operation of transmitting a network list, said network list comprising at least one network discovery element, each of said at least one network discovery elements represents a particular network and comprises at least connection information for connecting to said network and a category assigned to said network, an operation of determining at least one desired category, and an operation of transmitting a control signaling comprising said at least one desired category.

According to further exemplary embodiments of the present invention, each of the at least one desired categories is indicative of a particular network to be used.

According to still further exemplary embodiments of the present invention, the connection information comprises at least one of a network type of the network, information for identification of said network, and configuration information for enabling access to said network.

According to still further exemplary embodiments of the present invention, the control signaling comprises a name of one desired category.

According to still further exemplary embodiments of the present invention, the control signaling comprises a part of a name and/or a wildcard indicative of one or more desired categories.

According to still further exemplary embodiments of the present invention the control signaling comprises a bit string, wherein each bit position of said bit string is assigned to a certain desired category.

The above proposed mechanisms according to exemplary embodiments of the present invention provide the (operator of the) 3GPP network with the opportunity to influence dynamically which networks are automatically accessible (i.e. "known") by UEs assigned to the 3GPP network. Unlike with ANDSF policies (ISMP or ISRP), Discovery-Information does not explicitly indicate what networks should be used e.g. in priority order. Instead, the identified networks are only made "known" to the devices. Such approach does not interfere with the logic of Wi-Fi network selection implemented in the current smart phones (iOS, Android, Windows Phone, and others), thus making it easier to implement ANDSF functionality for the device vendors.

Further, since implementing ANDSF policies (ISMP, ISRP) would mean giving up the Wi-Fi network selection logic from the device manufacturer to the network/operator, such implementation is not always intended. The mechanisms according to exemplary embodiments of the present invention perfectly balance between device vendors' and operators' desire for controlling Wi-Fi network selection. Namely, for the operator, a dynamic tool for influencing which Wi-Fi networks shall be used in certain circumstances by making only the desired Wi-Fi networks "known" to the UEs can be provided, while the UEs' still hold the final decision about the Wi-Fi network selection.

The above-described procedures and functions may be implemented by respective functional elements, processors, or the like, as described below.

In the foregoing exemplary description of the network entities, only the units that are relevant for understanding the principles of the invention have been described using functional blocks. The network entities may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 6:
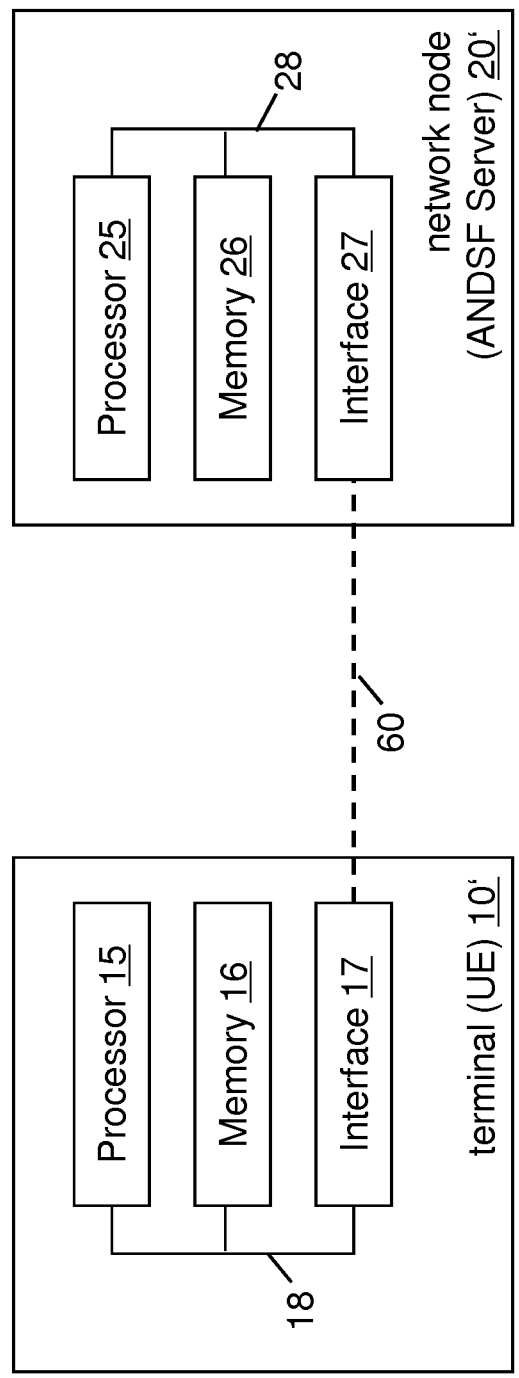
FIG. 6 is a block diagram alternatively illustrating apparatuses according to exemplary embodiments of the present invention.

In FIG. 6, an alternative illustration of apparatuses according to exemplary embodiments of the present invention is depicted. As indicated in FIG. 6, according to exemplary embodiments of the present invention, the apparatus (terminal) 10' (corresponding to the UE 10) comprises a processor 15, a memory 16 and an interface 17, which are connected by a bus 18 or the like. Further, according to exemplary embodiments of the present invention, the apparatus (network node) 20' (corresponding to the ANDSF Server 20) comprises a processor 25, a memory 26 and an interface 27, which are connected by a bus 28 or the like, and the apparatuses may be connected via link 60, respectively.

The processor 15/25 and/or the interface 17/27 may also include a modem or the like to facilitate communication over a (hardwire or wireless) link, respectively. The interface 17/27 may include a suitable transceiver coupled to one or more antennas or communication means for (hardwire or wireless) communications with the linked or connected device(s), respectively. The interface 17/27 is generally configured to communicate with at least one other apparatus, i.e. the interface thereof.

The memory 16/26 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 15, at least one memory 16 including computer program code, and at least one interface 17 configured for communication with at least another apparatus. The processor (i.e. the at least one processor 15, with the at least one memory 16 and the computer program code) is configured to perform receiving a network list, said network list comprising at least one network discovery element, each of said at least one network discovery elements represents a particular network and comprises at least connection information for connecting to said network and a category assigned to said network (thus the apparatus comprising corresponding means for receiving), to perform receiving a control signaling comprising at least one desired category, and to perform selecting said network based on said at least one desired category and the category assigned to said network (thus the apparatus comprising corresponding means for selecting).

According to exemplary embodiments of the present invention, an apparatus representing the network node 20 comprises at least one processor 25, at least one memory 26 including computer program code, and at least one interface 27 configured for communication with at least another apparatus. The processor (i.e. the at least one processor 25, with the at least one memory 26 and the computer program code) is configured to perform transmitting a network list, said network list comprising at least one network discovery element, each of said at least one network discovery elements represents a particular network and comprises at least connection information for connecting to said network and a category assigned to said network (thus the apparatus comprising corresponding means for transmitting), to perform determining at least one desired category (thus the apparatus comprising corresponding means for determining), and to perform transmitting a control signaling comprising said at least one desired category.

For further details regarding the operability/functionality of the individual apparatuses, reference is made to the above description in connection with any one of FIGS. 1 to 5, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for dynamic control of network selection. Such measures exemplarily comprise receiving a network list, said network list comprising at least one network discovery element, each of said at least one network discovery elements represents a particular network and comprises at least connection information for connecting to said network and a category assigned to said network, receiving a control signaling comprising at least one desired category, and selecting said network based on said at least one desired category and the category assigned to said network.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ANDSF Access Network Discovery and Selection Function
DM device management
EAP extensible authentication protocol
FQDN fully qualified domain name
HPLMN home public land mobile network
ID identity
IP internet protocol
ISMP inter-system mobility policy
ISRP inter-system routing policy
LAC location area code
LTE Long Term Evolution
MO management object
OMA Open Mobile Alliance
OS operating system
PSK pre-shared key
SSID service set identifier
TAC tracking area code
TS technical specification
UE user equipment
VPLMN visited public land mobile network

The invention claimed is:

1. A method comprising
receiving a network list, said network list comprising at least one network discovery element, each of said at least one network discovery elements represents a particular network and comprises at least connection information for connecting to said network and a category assigned to said network;
receiving a control signaling, on a different channel from a channel on which the network list is received, said control signaling comprising at least one desired category; and
selecting said network based on said at least one desired category and the category assigned to said network.

2. The method according to claim 1, wherein, in relation to said selecting, said method further comprises
adding, upon receipt of said control signaling, a network discovery element not existing in a desired network list from said network list to said desired network list, if the category comprised by said network element corresponds to said at least one desired category; and
removing, upon receipt of said control signaling, a network discovery element from said desired network list, if the category comprised by said network discovery element does not correspond to said at least one desired category.

3. The method according to claim 2, wherein, in relation to said selecting, said method further comprises
connecting to at least one network represented by a network discovery element in said desired network list.

4. The method according to claim 1, wherein
said connection information comprises at least one of a network type of said network, information for identification of said network, and configuration information for enabling access to said network.

5. The method according to claim 1, wherein
said control signaling comprises a bit string, wherein each bit position of said bit string is assigned to a certain desired category.

6. The method according to claim 1, wherein
said control signaling is a broadcast service.

7. A method comprising
transmitting a network list, said network list comprising at least one network discovery element, each of said at least one network discovery elements represents a particular network and comprises at least connection information for connecting to said network and a category assigned to said network;
determining at least one desired category; and
transmitting a control signaling, on a different channel from a channel on which the network list is transmitted, said control signaling comprising said at least one desired category.

8. The method according to claim 7, wherein
each of said at least one desired categories is indicative of a particular network to be used.

9. The method according to claim 7, wherein
said connection information comprises at least one of a network type of said network, information for identification of said network, and configuration information for enabling access to said network.

10. An apparatus comprising
a connection controller configured to
receive a network list, said network list comprising at least one network discovery element, each of said at least one network discovery elements represents a particular network and comprises at least connection information for connecting to said network and a category assigned to said network; and to
receive a control signaling, on a different channel from a channel on which the network list is received, said control signaling comprising at least one desired category; and a control module configured to select said network based on said at least one desired category and the category assigned to said network.

11. An apparatus comprising a connection controller configured to transmit a network list, said network list comprising at least one network discovery element, each of said at least one network discovery elements represents a particular network and comprises at least connection information for connecting to said network and a category assigned to said network; and a control module configured to determine at least one desired category;

wherein said connection controller is further configured to transmit a control signaling, on a different channel from a channel on which the network list is transmitted, said control signaling comprising said at least one desired category.

12. The apparatus according to claim 11, wherein each of said at least one desired categories is indicative of a particular network to be used.

13. The apparatus according to claim 11, wherein said connection information comprises at least one of a network type of said network, information for identification of said network, and configuration information for enabling access to said network.

14. The apparatus according to claim 11, wherein said control signaling comprises a bit string, wherein each bit position of said bit string is assigned to a certain desired category.

15. The apparatus according to claim 11, wherein said control signaling is a broadcast service.

* * * * *